United States Patent Office 3,531,434
Patented Sept. 29, 1970

3,531,434
STABILIZED POLYETHYLENE SULFIDE
Raymond Isaac, Elgin, Ill., assignor to Thiokol Chemical Corporation, Bristol, Pa., a corporation of Delaware
No Drawing. Filed Aug. 10, 1967, Ser. No. 659,584
Int. Cl. C08f *45/56*
U.S. Cl. 260—45.75
18 Claims

ABSTRACT OF THE DISCLOSURE

Salts of dithiocarbamic acids are used alone, and in conjunction with various other compounds such as organic nitrogen compounds, as stabilizers for moldable ethylene sulfide polymers to prevent the thermal degradation of such polymers during the use of the articles molded therefrom under atmospheric conditions.

BACKGROUND OF THE INVENTION

This invention relates to improved ethylene sulfide polymer based moldable compositions and improved stabilizer systems therefor. More specifically, the present invention is concerned with the use of various salts of dithiocarbamic acids, alone, and in conjunction with other compounds, as stabilizers for moldable ethylene sulfide polymers during the use of the articles molded therefrom at the elevated service temperatures employed during such use under atmospheric conditions.

Recent advances in the polymer field have provided solvent resistant ethylene sulfide polymers of high molecular weight for use as high temperature injection and extrusion molding materials. Because of their good solvent resistance and high temperature melting properties, these polymers can be processed by extrusion or injection molding techniques into a variety of useful products, such as pipe, film, filament, rods, bars, gears, pumps, valves and so forth. Such molded objects are commonly employed for long periods of use at service temperatures which are above room temperature, i.e., above about 25° C., and below the melting point of the polymers, i.e., below about 200–235° C. Such use conditions, however, may also result in some degradation of the polymer during such use as evidenced by a loss in physical properties of the molded objects. Such undesirable changes during the use of the molded objects, if allowed to go unchecked, could seriously lessen the value of such products and thereby limit the overall utility of the polymer.

SUMMARY OF THE INVENTION

It is, therefore, the main object of the present invention to provide stabilization systems and methods which will protect objects made from high molecular weight, moldable ethylene sulfide polymers from degradation during the use thereof at elevated service temperatures.

This and other objects of the present invention are accomplished by adding to a moldable ethylene sulfide polymer, prior to the molding thereof, a stabilizing system of one or more salts of a dithiocarbamic acid used alone or, optionally, in combination with various other compounds. More particularly, the present invention provides a composition comprising a moldable admixture of solid ethylene sulfide polymer and a stabilizing system of one or more salts of a dithiocarbamic acid and, optionally, other compounds as disclosed below.

By employing this particular stabilizing system, objects molded from high molecular weight, moldable, ethylene sulfide polymers can be protected against degradation at elevated service temperatures. Thus, the present invention allows for the use of objects molded from solid ethylene sulfide polymers without the deleterious effects that might be otherwise encountered under such service conditions without the use of such stabilizers, so as to consistently give satisfactory end products.

DESCRIPTION OF THE PREFERRED EMBODIMENTS

The stabilizer system of this invention comprises at least one salt of a dithiocarbamic acid. These salts have the structure

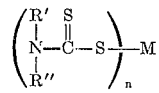

wherein M is a metal or $NX_4$ wherein X may be H or an alkyl, aryl, cyclic alkylene, aralkyl or alkaryl group, or combinations thereof, $n$ is the valence of M and R' and R" may be the same or different and may be H, or alkyl aryl, cycloalkyl, aralkyl or an alkaryl group.

The metals which are used in such compounds include lead, tin, mercury, zinc, bismuth, nickel, copper, cadmium, magnesium, sodium, selenium and tellurium.

Examples of such compounds are lead dimethyl dithiocarbamate, zinc dibenzyl dithiocarbamate, nickel dibutyl dithiocarbamate, tin (II) dimethyl dithiocarbamate, tin (IV) dimethyl dithiocarbamate, mercury (II) dimethyl dithiocarbamate, cadmium dimethyl dithiocarbamate, magnesium dimethyl dithiocarbamate, sodium dimethyl dithiocarbamate, dicyclohexyl ammonium dicyclohexyl dithiocarbamate, zinc dibenzyl dithiocarbamate, bismuth (III) dimethyl dithiocarbamate, selenium diethyl dithiocarbamate, tellurium diethyldithiocarbamate and copper (II) dimethyl dithiocarbamate. The salts of the dithiocarbamic acids may be used alone, or they may be used in combination with various other compounds in accordance with the teachings of the present invention. Other types of compounds which may be used with such salts include thermal stabilizers which are used to stabilize the polymer during the high temperature molding thereof, such as, organic nitrogen compounds used alone, or in combination with certain Group II–B metal compounds, as disclosed in U.S. Ser. No. 477,288 filed Aug. 4, 1965 in the name of Roy Larsen, now abandoned, and refiled as a continuation application Ser. No. 745,071 filed June 21, 1968, and in other patent applications disclosed in Ser. No. 477,288; organotin compounds used with nitrogen compounds and with rosins, as disclosed in two U.S. patent applications, each entitled Stabilized Compositions and Process and filed on July 27, 1967, one in the name of Ephraim H. Catsiff Ser. No. 656,369, published as a Defensive Publication on Nov. 5, 1968 and the other in the names of Ephraim H. Catsiff and Stephen W. Osborn Ser. No. 656,370, published as a Defensive Publication on Nov. 12, 1968; and inorganic selenocyanates and thiocyanates as disclosed in a U.S. patent application Ser. No. 659,858 entitled "Stabilized Compositions and Process" filed in the name of Stuart Ellerstein on Aug. 10, 1967.

When used alone or with the other compounds the dithiocarbamic acid salts are used in the amounts of about 0.1 to 5% by weight based on the weight of the polymer. The other compounds which may be used in combination with the dithiocarbamic acid salts according to the present invention, such as, the organic nitrogen compound systems, organo tin compound systems and selenocyanate and thiocyanate compound systems referred to above may be used in amounts of about 0.05 to 5.0% by weight of the polymer.

The stabilizing compounds may be added to the polymer separately or they may be admixed prior to being added to the polymer, to be practically useful, the stabilizer system should be uniformly and completely dispersed throughout the polymer prior to the processing or molding of the polymer.

Since the polymer molding or processing techniques employ relatively high temperatures usually ranging from about 215° to 270° C. or more, it is desirable that the stabilizer system whether liquid or solid, be substantially non-volatile at the molding, i.e., processing temperature used. For this reason, the stabilizer systems of the present invention and/or the components thereof should preferably have a boiling point(s) of at least about 200° C.

The inorganic thiocyanates and selenocyanates which may be used in conjunction with the salts of dithiocarbamic acids have the structure $$M'(XCN)_n$$

wherein

M' is $NH_4$ or a metal,
$n$ is the valence of M' and
X is Se or S.

When X is Se the compounds may be called selenocyanates and when X is S the compounds are termed thiocyanates. The metals which may be used in such compounds include potassium, sodium, zinc, lead, and mercury.

Examples of such compounds are ammonium thiocyanate, ammonium selenocyanate, potassium selenocyanate, sodium thiocyanate, sodium selenocyanate, zinc thiocyanate, lead thiocyanate and mercury thiocyanate.

The organic nitrogen compounds which may be used in the present invention include amides, amines, cyclic N-containing compounds and other N-containing compounds which function as amines, for example, ammonium salts of organic acids, e.g., ammonium benzoate.

Amides which may be used as stabilizers according to the present invention may be monomeric or polymeric in nature and should contain at least 5 carbon atoms. The polymeric amides may contain the amide groups in the backbone thereof, or the amide groups may be pendant to the polymeric backbone. Typical of such materials are caprolactam, adipamide, low molecular weight polyamides formed from hexamethylenediamine and adipic acid, acrylamide homopolymers and interpolymers; fatty acid polyamides; N,N-bis (hydroxyethyl)acrylamide; and adipoyldihydrazide and adducts or reaction products of methylene-bis-acrylamide and polyamines such as ethylene diamine and diethylene triamine.

Useful amines include monofunctional or polyfunctionals amines in which the amine groups may be primary, secondary, or tertiary. Functional groups other than amine groups may also be present.

Monofunctional amines containing no other functional groups should contain at least eight carbon atoms and include aliphatic compounds such as n-octadecylamine and branched octadecyl-dimethylamine and aromatic compounds such as phenyl-B-naphthylamine and dibenzylamine.

Monofunctional amines containing other functional groups include hydroxyl-containing amines such as those having as structures:

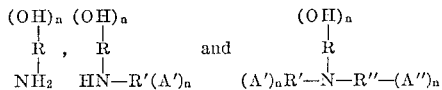

in which R, R' and R'' may be the same or different hydrocarbon or oxyhydrocarbon groups, A' and A'' are H or OH and $n$ is a whole number of at least 1. An R' or R'' group may have more than one OH group.

Examples of such hydroxyl-containing amines are the following: diethanolamine, diisopropanolamine, diglycolamine ($HOCH_2CH_2OCH_2CH_2NH_2$), aminotris (hydroxymethyl) methane, N-(2-hydroxyethyl) cyclohexylamine, DL-2 benzylamino-1-propanol, phenylethyl-ethanolamine, m-tolydiethanolamine and phenyldiethanolamine.

Polyfunctional amines include aliphatic tertiary amines such as N,N,N',N' - tetrakis (ethyl)ethylenediamine, N,N,N',N'-tetrakis (2-cyanoethyl) ethylenediamine; polyalkanol-polyamines such as N,N,N',N'-tetrakis (2-hydroxyethyl) ethylenediamine, N,N,N',N'-tetrakis (2-hydroxypropyl) ethylenediamine, and

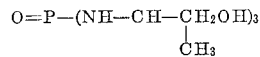

compounds having the structure A—NH(R—NH)$_n$A' in which R is an alkylene, arylene, alkarylene, or aralkylene group, $n$ is a whole number of at least 1; A and A' may be the same or different and may be

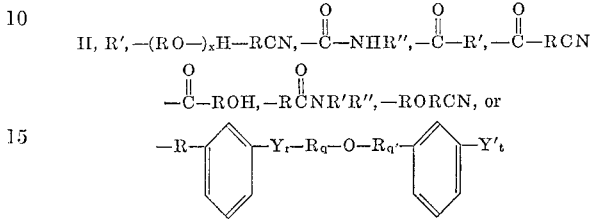

in which R is the same as above, R' is an alkyl, cycloalkyl, aryl, alkaryl or aralkyl group, R' is H or R', $x$ is a whole number of 1 through 25, Y and Y' may be the same or different and may be —R(NHR)$_n$—NH—A, —CH$_2$OH, or R' in which A, R and R' are the same as above $q$ and $q'$ are 0 or 1, $r$ is 0 or a whole number from 1 through 4, and $t$ is 0 or a whole number from 1 through 5. A limiting value for $x$ has been given because as the length of the polyether chain increases, the activity of the amine portion, which is believed to be the more active portion for stabilizing purposes, tends to diminish. However, no such limiting value has been given to the subscript $n$, since, regardless of the length of the polyamine chain, there does not appear to be any lessening of the activity of the amine function for stabilizing purposes.

Examples of polyfunctional amines which may be used according to the present invention are polyalkylene polyamines, such as, diethylene triamine, triethylene tetramine, tetraethylene pentamine, pentaethylene hexamine, dipropylene triamine, tri-1,3-propylene tetramine, dibutylene triamine, tributylene tetramine, tetrabutylene pentamine, bis-(hexamethylene) triamine; N(B hydroxyethyl) diethylene triamine; p-aminodiphenylamine, dibenzyl ethylene diamine, N,N'-bis-(2-aminoethyl)-4,4'-oxydibenzylamine, p-phenylenediamine, bis(p-ethylamine) diphenylamine poly(alkyleneimines), such as poly(ethyleneimine); adducts of alkylene oxides and polyalkylene polyamines such as an adduct of ethylene oxide or propylene oxide and tetraethylene pentamine, diethylene triamine or dipropylene triamine; adducts of polymerized alkylene imines and alkylene or aryl oxides such as adducts of polymerized ethyleneimine or ethylenediamine and styrene oxide; adducts of alkylene or polyalkylene polyamines and unsaturated nitriles, such as, adducts of ethylenediamine or diethylene triamine and acrylonitrile; adducts of polyalkylene polyamines and alkyl halides, such as, adducts of tetraethylene pentamine and n-octyl chloride; adducts of polyalkylene polyamines and alkyl or aryl isocyanates, such as adducts of tetraethylenepentamine and phenyl or ethyl isocyanate; alkylene diureas such as 1,1' ethylenediurea; adducts of unsaturated amides and alkylene or polyalkylene polyamines, such as, an adduct of ethylenediamine and acrylamide; adducts of alkylene or polyalkylene polyamines and diphenyl oxide; adducts of alkylene or polyalkylene polyamines and chloromethylated diphenyl oxides such as the ethylene diamine or diethylenetriamine adduct of chloromethylated diphenyl oxide.

Compounds containing nitrogen in a ring structure include: tris-(2-methyl aziridinyl) triazine; tripropyleneimine melamine; phthalazine;

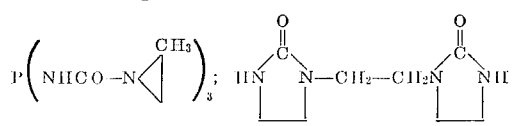

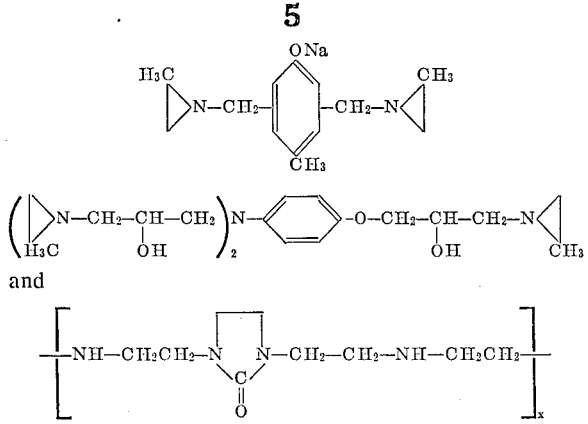

and

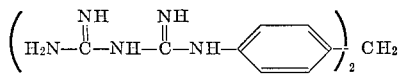

Other nitrogen containing compounds which may be used according to the present invention include:

Adducts or reaction products of P(NCO)$_3$ and polyalkylene polyamines such as diethylene triamine and triethylene tetramine;

$$\left( H_2N-\overset{NH}{\underset{\|}{C}}-NH-\overset{NH}{\underset{\|}{C}}-NH-\underset{\diagup}{\underset{\diagdown}{\bigcirc}}\right)_2 CH_2$$

and adducts of 2,5-hexanedione and alkylene polyamines such as ethylene diamine and triethylene tetramine.

The solid, high molecular weight moldable ethylene sulfide polymers which may be treated with the stabilizers according to the present invention may be homopolymers or they may be interpolymerization products which contain a major portion of ethylene sulfide and a minor portion of one or more other interpolymerizable monomers. Such other interpolymerizable monomers include:

(A) Vicinal episulfide monomers such as styrene sulfide and alkylene sulfides such as propylene sulfide, 1,2-butylene sulfide, 2,3-butylene sulfide, isobutylene sulfide, cyclohexene sulfide, vinyl cyclohexene sulfide, 2-benzylthiirane, paramethyl styrene episulfide, allyl thioglycidyl ether, thioglycidyl acrylates, thioglycidyl alkaacrylates such as thioglycidyl methacrylate, vinyl cyclohexene episulfide, butadiene monoepisulfide and 1,2-epoxy-3,4-epithiobutane;

(B) Cyclic organic sulfides having the structure

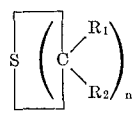

where $n=3$ to 6 and $R_1$ and $R_2$ may be H, a lower, branched or linear alkyl group having from 1 to 10 carbon atoms, an aryl, an arylalkyl and/or an alkylaryl group, and $R_1$ or $R_2$ may also be heterocyclic, alicyclic, bicyclic or polycyclic; examples of such cyclic sulfides are trimethylene sulfide, pentamethylene sulfide and hexamethylene sulfide;

(C) Compounds containing ethylenic unsaturation, i.e.,

such as olefins, such as ethylene, propylene, butylene and isobutylene; conjugated and non-conjugated dienes, such as butadiene, isoprene and 1,4-pentadiene; and vinyls, such as styrene, vinyl acetate, ethyl acrylate, methyl acrylate, methyl methacrylate, butyl acrylate, acrylonitrile, vinyl isobutyl ether, α-methyl styrene, hydroxypropyl methacrylate, tetrafluoroethylene, chlorotrifluoroethylene and hexafluoropropylene;

(D) Compounds having the structure

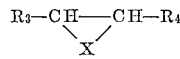

in which X is O or N and $R_3$ and $R_4$ may be H, a lower branched or linear alkyl group having from 1 to 10 carbon atoms, an aryl, aralkyl, and/or alkaryl group, and $R_3$ or $R_4$ may also be heterocyclic, alicyclic, bicyclic or polycyclic; examples of such compounds are styrene oxide, ethylene oxide, propylene oxide, 1,2-butylene oxide, 2,3-butylene oxide, ethylene imine and propylene imine; and (E) Other compounds such as formaldehyde, trioxane, hydroxyisobutyric acid, tetrahydrofuran, 1,3-dioxolane, 1,4-dioxane, trimethylene oxide, tetramethylene oxide and pentamethylene oxide.

These ethylene sulfide polymers may be prepared using a variety of polymerization catalysts under a variety of polymerization conditions. Useful polymerization catalysts include composite materials or the reaction product of two components. On component is an organometallic compound of the formula $R_2M$, wherein R is alkyl or aryl and M is zinc, cadmium or mercury. The second component, can be generally characterized as having at least one pair of unshared electrons; all substances of this type do not have the same degree of utility as a second component. One group that is especially useful comprises compounds having an active hydrogen atom including, for example, water; hydrogen sulfide; primary and secondary alkylamines; e.g., methyl, ethyl and diethyl amines; alkanols, e.g. mercaptoethanol; acetone; lower fatty acids, e.g., acetic acid; and aldehydes, e.g., butyraldehyde. Additionally, catalysts employing as the second component or co-catalyst elemental oxygen or sulfur, carbonyl sulfide and carbon disulfide are useful. A typically, useful catalyst includes the reaction product of diethyl zinc and water.

These composite polymerization catalysts may be prepared by reacting the two components in a suitable inert liquid reaction medium, benzene, hexane, tetrahydrofuran, petroleum, ether or mineral oil, employing a molar ratio of co-catalyst to organometallic component in the range of about 0.5:1 to 3:1. Reaction temperatures may vary from about —20° C. to 100° C.

For more satisfactory catalyst activity and desirable polymer properties, freshly prepared catalyst should be used. The catalyst may be prepared directly in the polymerization reaction vessel prior to or coincident with the initiation of the polymerization reaction. If it is necessary to store the catalyst for an appreciable period of time before it is used, say 48 hours or more, the prepared catalyst can best be maintained by storage at low temperatures.

Since oxygen or water may function as co-catalysts, the catalyst preparation reactions and the polymerization reactions should be carried out in an oxygen and water free environment; except in the cases when these substances are used as catalyst components. Catalyst preparation reactions and polymerization reactions are generally conducted in an atmosphere of inert gas, such as, nitrogen, helium or argon.

The polymerization is generally carried out by any of the wide variety of polymerization techniques whereby the monomer or monomers are contacted with the catalyst. It is preferable, in order to obtain optimum results, that the starting monomeric materials be freshly distilled just prior to use from a reducing agent, e.g., calcium hydride, to remove oxidation products and water therefrom. A catalyst concentration with the ranges of about 0.05 to 3% by weight of the monomer mixture is useful. The polymerization reaction temperature is equally within the range of about —20° C. to 150° C.

Polymerizations may be conducted in any of various bulk, solvent, solution, vapor phase, or other polymerization technique conventionally employed. Solvent polymerization techniques are especially useful, and typical solvents useful for this purpose include aromatic hydrocarbons, e.g., benzene, toluene or xylene; aliphatic hydrocarbons, e.g., isopentane, n-hexane or octane, chlorinated hydrocarbons, e.g., carbon tetrachloride, methylene chloride or ethylene chloride; ethers, e.g., diethyl ether, dioxane, or tetrahydrofuran.

Homopolymers and interpolymers of a more granular nature than those prepared as described above and which have better handling properties may be produced using a "seed catalyst" system. In the "seed catalyst" procedure the organometallic compound/co-catalyst material (in about 1:1 mol ratio) is used to polymerize the episulfide monomer charge in solution at room temperature. About 0.05 to 10 mol percent catalyst based on the monomer charge is used. Solution polymerization with solvents as tetrahydrofuran, petroleum ether, benzene and toluene is used. The resultant polymerization product contains all the catalyst initially charged. The polymer product is then recovered, dried, and converted to a granulated polymer product having particles of less than about 20 mesh in size. The granulated polymer product containing the original catalyst charge is a "seed catalyst" which may be used to polymerize ethylene sulfide alone or with other monomers to form granular powders. About 1 to 5% by weight of the seed catalyst is used based on the monomer charge. The seed catalyst based polymerization is generally conducted at temperatures of about 170° F. to 185° F. for about one to three hours. The yields of the granular polymer obtained are about 80–100%. The seed catalyst polymer produced therewith have essentially the same chemical characteristics, and they may be used in subsequent molding operations without separating one from the other.

Other catalysts, useful in the preparation of moldable ethylene sulfide polymers include cadmium compounds such as hydroxides, sulfides, silicates, chromates, adipates, sulfates and carbonates; zinc or mercury compounds such as peroxides, sulfides, chromates, adipates, oxalates, oxides, hydroxides and carbonates; carbonates of zinc, manganese, lead, cadmium, cobalt and nickel; oxides of metals such as $Na_2O$; $Na_2O_2$; $MgO$; $Al_2O_3$; $K_2O$, $K_2O_2$; $CaO$, $CaO_2$; $Fe_2O_3$; $CoO$; $NiO$; $SrO$, $SrO_2$; $SnO$, $SnO_2$; $Sb_2O_3$; $BaO$, $BaO_2$; $PbO$, $PbO_2$ and $Bi_2O_3$. Other catalyst systems also useful in the preparation of moldable polymers which may be stabilized according to the present invention include Friedel-Crafts catalysts such as sulfuric acid and boron trifluoride; ionizing radiation; sodium naphthenate; sodium cyanide; metal alkyls such as butyl lithium and metallic sodium dispersions.

The catalysts mentioned above may be used in a variety of polymerization procedures to produce ethylene sulfide homopolymers or graft, random or block interpolymers of ethylene sulfide and one or more monomers interpolymerizable therewith.

The following examples are merely illustrative of the present invention and are not intended as a limitation upon the scope thereof.

EXAMPLE A

Preparation of polymer (A) Preparation of seed catalyst: Under a nitrogen atmosphere the following reactants were added, in the order presented, into a 2½ gallon solution bottle: 2835 ml. of tetrahydrofuran and sufficient diethyl zinc to effect a 1:1 mol ratio with 9.838 ml. of water added subsequent to the diethyl zinc. The materials were agitated by sparging with nitrogen. Into a second vessel, a clean dry reactor, purged with nitrogen, 51.9 pounds of petroleum ether was added and then charged with 6.49 pounds of ethylene sulfide. The temperature of the reactor was then adjusted to 78±2°F. and the entire above prepared solution of tetrahydrofuran, diethyl zinc and water added. The reactor was then agitated for one hour at the above temperature. The polymer thus produced was centrifuged out and subsequently dried for 3 hours at 160 to 180° F. under reduced pressure. The dried polymer was then compacted and pulverized to pass thru a #40 screen. A yield of 1.3 pounds of seed catalyst polymer was thereby obtained.

(B) Preparation of the polymer: A suitable sized reactor was purged with nitrogen for 15 minutes and charged with 120 pounds of petroleum ether and 60.1 pounds of ethylene sulfide in the order presented. An additional 50 pounds of petroleum ether was then charged into the reactor to completely flush the ethylene sulfide from the charging lines into the reactor. The seed catalyst, prepared in (A) above, was then charged into the reactor, the nitrogen shut off, the reactor sealed and the temperature raised to 176±5° F. in 1½ hours. The reaction was continued at this temperature for two additional hours. The polymerized mass and solvent was then cooled to less than 100° F., separated by centrifuging and dried under reduced pressure for four hours at about 190° F. A yield of about 80% was obtained.

EXAMPLE B

Preparation of stabilized compositions

Various combinations of stabilizers, according to the present invention, and ethylene sulfide polymer, prepared as in Example A above, were blended together and molded into test bars in order to test the physical properties of such test bars and thus evaluate the stabilizer systems used therein. The components of each of the test compositions were blended together in a Waring Blendor at high speed for about three minutes in 30 second increments to avoid heat buildup.

EXAMPLE C

Molding of the test samples

The control samples of polymer alone, and the blended compositions of polymer and stabilizer prepared as disclosed in Eaxmple B above, were each injection molded into test bars. For the molding operation there was used a Van Dorn (Cleveland, Ohio) injection molding device, Model 50–RS–3, having a shot capacity of 3 ounces (avoirdupois) of polystyrene. In preparing the molded specimens the test composition is charged into the molding device and allowed to pass through three heating zones over a 3 to 5 minute period in order to gradually build up the temperature of the test composition and prepare a molten system for the molding step. The three zones and their respective barrel temperatures are feed zone, 340±20° F.; middle or compression zone, 375±15° F.; and front or metering zone, 405±15° F. From the front or metering zone the now molten composition is injected into a mold and molded over a 66.5 second cycle that includes injection into the mold at 405±15° F., holding in the mold at 195±10° F. and ejection of the molded piece from the mold. Prior to being tested for physical properties as described in Example D below the molded specimens are cooled at room temperature, i.e., about 25° C., in the atmosphere for at least 24 hours prior to testing.

Two types of test bars may be made. One bar may be made for use in the Izod impact resistance test in accordance with ASTM D–256–56 (1964) and the other is made for use in the testing for tensile properties in accordance with ASTM D–638–64T (1964). The dimensions for the test bar specimens are set forth in the ASTM regulations.

EXAMPLE D

Testing of the test specimens

After being cooled at room temperature for at least 24 hours, the test specimens made as disclosed in Example C above were then tested for various physical properties in order to evaluate the stabilizer systems used hereerties in order to evaluate the stabilizer systems used therein. The evaluation of the stabilizer systems was programmed so as to demonstrate the utility of the stabilizer for the purpose of preventing or retarding deterioration in the physical properties of molded articles prepared therewith when such molded articles are exposed to air at elevated temperatures for prolonged periods of time. The test samples, therefore, were aged in a heated circulating air oven at elevated temperatures of about 120–150° C. for various periods of time before the physical properties of such specimens were ascertained. This aging process is intended to simulate environments that might be encountered by articles molded from ethylene sulfide polymers under certain use conditions, such as during the use of molded automobile engine parts.

The test procedures of ASTM D–638–64T (1964) were used for the evaluation of tensile (reported in pounds per square inch), elongation (reported in percent) and modulus (reported in pounds per square inch) properties.

The test procedure of ASTM D–256–56 (1964) were used for the evaluation of impact resistance properties (reported in foot-lbs./inch of notch).

Each of the test results reported is the average of 3 to 5 tests.

EXAMPLES 1–3

Various formulations containing various stabilizer systems and ethylene sulfide polymer were prepared and evaluated. The polymer was made as disclosed in Example A and the formulations were prepared and molded as disclosed in Examples B and C. A different batch of polymer was used for each of Examples 1, 2, and 3. The molded specimens were made for testing in accordance with ASTM D–256–56 (1964) and aged at 121° C. as disclosed in Example D.

The physical properties were ascertained both initially, i.e., prior to the elevated temperature aging study, as well as at the end of various stated time periods during the aging study. A number of samples of each molded formulation were prepared at the same time, and simultaneously aged, so as to allow for a different set of 3 to 5 of such samples to be tested at the stated time period during the aging study.

The formulations thus evaluated and the physical results obtained upon testing the molded and aged specimens are disclosed below in Table I. These results show that the molded specimens made with the stabilizer systems of the present invention retain their properties for longer periods of time than unstabilized specimens.

4. A composition of matter as in claim 1 wherein M is zinc.

5. A composition of matter as in claim 4 wherein said salt is zinc dimethyl dithiocarbamate.

6. A composition of matter as in claim 1 wherein M is nickel.

7. A composition of matter as in claim 6 wherein said salt is nickel dibutyl dithiocarbamate.

8. A composition of matter as in claim 1 which further comprises at least one compound having the structure $M'(XCN)_{n'}$ wherein $M'$ is $NH_4$ or a metal selected from the group consisting of potassium, sodium, zinc, lead and mercury; $n'$ is the valence of $M'$ and $X$ is Se or S.

9. A composition of matter as in claim 8 in which said compound is KSCN.

10. A composition of matter as in claim 1 which further comprises at least one organic nitrogen compound selected from the group consisting of (1) amides containing at least 5 carbon atoms; (2) monofunctional, unsubstituted aliphatic amines containing at least 8 carbon atoms; (3) monofunctional hydroxyl-containing amines having the structures:

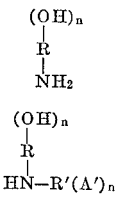

and

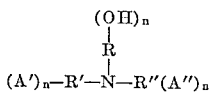

where R, R' and R'' are hydrocarbon or oxyhydrocarbon groups, A' and A'' are H or OH, and $n$ is a whole number of at least 1; and (4) polyamines having the structure

| Example | Formulation tested-polymer plus percent by weight of listed additive | Izod break energy (ft.-lbs./in.)/days/air/121° C. | | | | | | | | |
|---|---|---|---|---|---|---|---|---|---|---|
| | | Initial | 1 | 4 | 7 | 10 | 14 | 21 | 28 | 180 |
| 1a | Polymer only—no additive | 1.22 | 0.55 | 0.27 | 0.23 | | 0.26 | | 0.24 | |
| 1b | 2.0% PbDMD | 1.32 | 1.29 | 1.17 | 1.16 | | 0.92 | | 0.44 | |
| 1c | 2.0% PbDMD, 1.0% KSCN | 1.46 | 1.19 | 1.25 | 1.37 | | 0.73 | | 0.59 | |
| 2a | Polymer only—no additive | 1.20 | 0.66 | 0.30 | 0.21 | 0.23 | | | | |
| 2b | 2.0% ZnDMD | 0.89 | ¹0.52 | ²0.61 | 0.70 | 0.56 | 0.47 | | 0.36 | |
| 2c | 2.0% PbDMD | 1.02 | ¹1.04 | ²1.00 | 0.59 | | ³0.63 | | 0.35 | |
| 2d | 2.0% PbDMD, 1.0% KSCN | 1.23 | ¹1.23 | ²0.97 | .1.08 | 1.08 | 0.82 | 0.75 | | |
| 3a | 0.1% ZnDMD, 2.0% TETA | 1.21 | 0.29 | 0.41 | | 0.46 | 0.56 | | | 0.48 |
| 3b | 0.1% NiDBD, 2.0% TETA | 1.08 | 0.27 | 0.43 | | 0.54 | 0.56 | | | 0.51 |

¹ ² ³ Tests were done, respectively, at 3, 5 and 18 days.
PbDMD=lead dimethyl dithiocarbamate.
ZnDMD=zinc dimethyl dithiocarbamate.
NiDBD=nickel dibutyl dithiocarbamate.
TETA=triethylene tetramine.

What is claimed is:

1. A composition of matter comprising an admixture of a high molecular weight, moldable ethylene sulfide polymer having a melt index at 215° C. below about 1.5 grams per minute and a stabilizing system which comprises at least one salt of a dithiocarbamic acid in which said salt has the structure

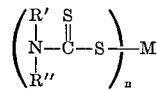

wherein M is a metal or $NX_4$ and X is selected from the group consisting of H and alkyl, aryl, cyclic alkylene, aralkyl and alkaryl groups; $n$ is the valance of M and R' and R'' are selected from the group consisting of H and alkyl, aryl, cycloalkyl, aralkyl and alkaryl groups.

2. A composition of matter as in claim 1 wherein M is lead.

3. A composition of matter as in claim 2 wherein said salt is lead dimethyl dithiocarbamate.

$A-NH(-R-NH)_nA'$ in which R is selected from the group consisting of alkylene, arylene, alkarylene and aralkylene groups; $n$ is a whole number of at least 1; A and A' are selected from the group consisting of $$H, \ R', \ -(RO-)_xH, \ -RCN, \ -\overset{O}{\underset{\|}{C}}-NHR'', \ -\overset{O}{\underset{\|}{C}}-R'$$

$$-\overset{O}{\underset{\|}{C}}-RCN, \ -\overset{O}{\underset{\|}{C}}-ROH, \ -R\overset{O}{\underset{\|}{C}}NR'R'', \ RORCN \text{ and}$$

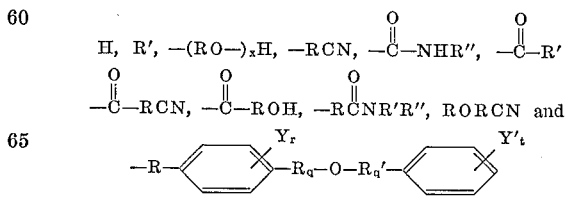

in which R is the same as above, R' is selected from the group consisting of alkyl, aryl, alkaryl and aralkyl groups; R'' is selected from the group consisting of H and R'; $x$ is a whole number from 1 through 25; Y and Y' are selected from the group consisting of $$-R-(NHR)_nNH-A$$

$-CH_2OH$, and R' in which A, R, and R' are the same as above; $q$ and $q'$ are 0 or 1; $r$ is 0 or a whole number from 1 through 4; and $t$ is 0 or a whole number from 1 through 5.

11. An article molded from the composition of claim 2.
12. An article molded from the composition of claim 8.
13. An article molded from the composition of claim 10.
14. An article molded from the composition of claim 13.
15. A composition of matter comprising an admixture of solid ethylene sulfide polymer and a stabilizing system for said polymer which comprises lead dimethyl dithiocarbamate and KSCN.
16. A composition of matter comprising an admixture of solid ethylene sulfide polymer and a stabilizer system for said polymer which comprises triethylene tetramine and zinc dimethyl dithiocarbamate.
17. A composition of matter comprising an admixture of solid ethylene sulfide polymer and a stabilizer system for said polymer which comprises triethylene tetramine and nickel dibutyl dithiocarbamate.
18. A composition of matter comprising an admixture of a high molecular weight, moldable ethylene sulfide polymer having a melt index at 215° C. below about 1.5 grams per minute and a stabilizing system which comprises at least one salt of a dithiocarbamic acid in which said salt has the structure

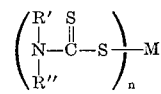

wherein M is selected from the group consisting of lead, tin, mercury, zinc, bismuth, nickel, copper, cadmium, magnesium, sodium, selenium, tellurium and $NX_4$ and X is selected from the group consisting of H and alkyl, aryl, cyclic alkylene, aralkyl and alkaryl groups; $n$ is the valence of M and R' and R'' are selected from the group consisting of H and alkyl, aryl, cycloalkyl aralkyl and alkaryl groups.

References Cited
UNITED STATES PATENTS 3,345,308   10/1967   Lal _____ 260—79.7

JAMES A. SEIDLECK, Primary Examiner

V. P. HOKE, Assistant Examiner

U.S. Cl. X.R.

260—45.7, 45.8, 45.9, 45.95